United States Patent
Walters et al.

(10) Patent No.: US 7,523,267 B2
(45) Date of Patent: Apr. 21, 2009

(54) METHOD FOR ENSURING FAIRNESS AMONG REQUESTS WITHIN A MULTI-NODE COMPUTER SYSTEM

(75) Inventors: Craig R. Walters, Highland, NY (US); Vesselina K. Papazova, Highland, NY (US); Michael A. Blake, Wappingers Falls, NY (US); Pak-kin Mak, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 270 days.

(21) Appl. No.: 11/532,156

(22) Filed: Sep. 15, 2006

(65) Prior Publication Data

US 2008/0071990 A1    Mar. 20, 2008

(51) Int. Cl.
*G06F 13/00* (2006.01)
(52) U.S. Cl. .................. 711/144; 711/145; 711/147; 711/130
(58) Field of Classification Search .......... 711/144, 711/145, 147, 130
See application file for complete search history.

(56) References Cited

U.S. PATENT DOCUMENTS

| | | | |
|---|---|---|---|
| 2004/0024967 A1* | 2/2004 | Zhang | 711/118 |
| 2006/0069873 A1* | 3/2006 | Carlson | 711/125 |
| 2006/0184741 A1* | 8/2006 | Hrusecky et al. | 711/130 |

* cited by examiner

*Primary Examiner*—Hong Kim
(74) *Attorney, Agent, or Firm*—Lynn L. Augspurger

(57) ABSTRACT

A method to use of dual valid bit sets including a regular bit set and alternate valid bits set which prevents new requests to a given cache line from entering a multi-nodal computer systems' nest system until all requests to the given cache line have been completed successfully. By providing the alternate valid bits the dual set of resource valids for each remote requester is provided for each remote requester, where one set of valids indicates if the resource is valid and actively working on the line, and the other set of valids indicates if the resource was valid but encountered some conflict that requires resolution before the request can complete. Only on successful reload and completion of the remote operation does this alternate address valid bit reset and open the way for any pending interface requests to proceed, so all outstanding requests currently loaded in a local resource within the nest system are able to complete before new interface requests are allowed into the system.

12 Claims, 3 Drawing Sheets

Multi-node computer system

Multi-node computer system

FIGURE 2

1. A processor initiated request into a nest system with a shared cache level of coherency and encounters a miss.

2. A resource of a local node is loaded to fetch the requested line either from memory or a remote node of the multi-node multi-processor system.

3. The local node resource sends a request to the remote node to load a resource onto the remote node for fetching the requested line back to the requesting local node.

4. (a) Whereupon, The remote resources on a regular' valid bit, indicating that it is valid for compare operations on the requested line and no other processor requests, either by another processor on a local node or a remote node, to the requested line can be initiated until the requestor has reset.                                            OR:

4. (b) After receiving a request to load a resource onto the remote node for fetching the requested line back to the requesting local node, the remote node resource turns on dual valid bit sets, a regular one set of valids will indicate if a resource is valid and actively working on the requested line, with the other alternate set of valids will indicate if the resource was valid but some conflict exists that requires resolution before the request can complete.

5. Thereafter, after 4.(b) dual valid bit sets are established, a remote requestor is rejected back to the local resource due to the existence of a conflict, and a regular valid bit set for the requestor will turn off but the alternate valid bit set will remain active indicating that another node is currently trying to obtain ownership of the line, so a local processor node's new request to the same line it encounters a compare against the remote requestor and will be forced to wait for its' completion before resuming a request.

METHOD FOR ENSURING FAIRNESS AMONG REQUESTS WITHIN A MULTI-NODE COMPUTER SYSTEM

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND OF THE INVENTION

1. Field of the Invention

This invention relates to computer system design and particularly to multi-node request fairness algorithms.

2. Description of Background

Historically, contention management schemes have been introduced in multi-node system to ensure timely processing of requests, to avoid system deadlocks, and/or to ensure system serialization, as applicable.

Of these management schemes the simplest is the basic protocol reject algorithm, where requests are sent from one node to the next and in the case of contention, the request on the remote node is rejected back to the requesting node, for an eventual retry under the presumption that by the time the request enters the remote node for a second time, the point of contention has been resolved and ownership of the line/data can be given to the remote requesting processor. In the cases where contention persists, continual rejecting and re-launching of the request persists until the contention is resolved and the requesting processor obtains ownership.

At the next level of complexity, hang detect algorithm have been introduced to designs to allow operations that have persisted in multi-node systems for an excessive period of time to stall new requests in an attempt to resolve the point of conflict before a noticeable stall can occur and operation timeout can be encountered.

In the more complex case where full ordering is required, system serialization algorithms are typically introduced that queue events in the order that they typically received at a central facility in the system. This ensures the ordering of events at the cost of increased hardware complexity.

In either of these cases, the management of the contention handling is typically done after a lengthy delay is detected in the system and an after-the-fact algorithm has to come into play, or a strict ordering algorithm is observed which is unrealistic for all types of operations as it is neither requisite nor affordable from a hardware investment and processing timeliness perspective.

If we step back and re-examine the basic protocol reject algorithm, ordering is observed assuming that the contention over a single point in the system is infrequent and the eventuality of the request obtaining ownership of the line will occur within a timely enough manner that any improved algorithm and the investment it requires is unnecessary.

Unfortunately, all of these algorithms fail to address the underlying issue within the system that produces the source of contention. This is the simple fact that under these algorithms previously described, new requests are not prevented from entering the system until either all interface hardware is consumed or the system has reached a point where all new requests must be stopped to prevent either a deadlock or a major system timeout or clockstop.

As a result, all of these algorithms typically address the contention after the fact and dismiss timeliness for design simplicity, with the exception of serialization logic which trades off accuracy for complexity.

The invention described herein seeks to maintain simplicity, while addressing contention and the timeliness that improved algorithms bring.

SUMMARY OF THE INVENTION

This invention presents a method for ensuring fairness amongst requests within a multi-node system. Unlike the algorithms previously described, this algorithm provides a mechanism for ensuring fairness amongst requests through an active handling of the contention at the point when a request enters the system and more specifically when it enters a remote node.

If we step back to the basic multi-node remote priority algorithm previously mentioned, we would observe the following behavior in a typical system:

A processor initiated request (say a line fetch request) comes into the shared cache/level of coherency (typically referred to as 'nest' in this context) and encounters a miss in the nest cache.

As a result of the miss a local resource is loaded to fetch the line either from memory or a remote node.

The local resource sends a request to the remote node to load a resource on the remote node (for fetching the line back to the requesting node).

Upon being loaded, the remote resource would turn on its' valid bit, indicating that it is valid for compare on this line and no other requests, initiated either by a processor on this node, I/O, or a remote node, to this line can be initiated until this requestor has reset.

If no conflict is encountered, the remote resource would fetch the line back to the local node for processing/update. If a conflict is encountered on the remote node, the remote requestor would send back a reject response to the requesting node and reset its valid.

The local resource upon seeing this conflict response would typically re-launch the request in an attempt to obtain the line under the premise that by the time the request was seen on the remote node again, the point of conflict would be resolved. This re-launch would be repeated until the contention was resolved and the request completed successfully.

Now under this simple protocol, during the time between when the request was rejected off of the remote node and the remote resource has reset, and the local requestor re-launches this request to the remote node and reloads the remote resource, the processors and I/O channels on the remote node have the opportunity to initiate new requests that could result in additional points of conflict and hence additional reject responses to the local requestor. This reject scenario results in sub-optimal response times for a given request and allows for an "unfairness" of request processing due to the window it opens up where new processor initiated requests can come into the nest.

The invention described herein addresses this "unfairness" directly through an algorithm that prevents new requests from entering the system (on any node), when a point of contention arises, until such a time is reached that the last requestor actively contesting the line has its' request satisfied. As a result, requests actively entering the system for uncontested lines are able to continue processing normally. And in cases where a new request enters the system for a contested line, the new request is actively withheld/stalled until the contention is resolved.

As a result, this invention simply seeks to address the issue of resolving contention around a given line in a given system in a given period where the point of contention is initially detected in the system. The ordering of requests actively processing in the system to a given line is not addressed. This invention focuses on the algorithm used to prevent new requests from entering the system such that the existing contention can be actively handled and resolved, before new points of contention can enter the system.

Additional features and advantages are realized through the techniques of the present invention. Other embodiments and aspects of the invention are described in detail herein and are considered a part of the claimed invention. For a better understanding of the invention with advantages and features, refer to the description and to the drawings.

TECHNICAL EFFECTS

As a result of the summarized invention, technically we have achieved a solution which improves Reliability, Availability and Serviceability (RAS), and eliminates the window where new requests to a line can enter the nest while there are existing requests already contending for ownership of the line.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 2 illustrates a flow chart of the process, while

The detailed description explains the preferred embodiments of the invention, together with advantages and features, by way of example with reference to the drawings.

DETAILED DESCRIPTION OF THE INVENTION

Figure 1:
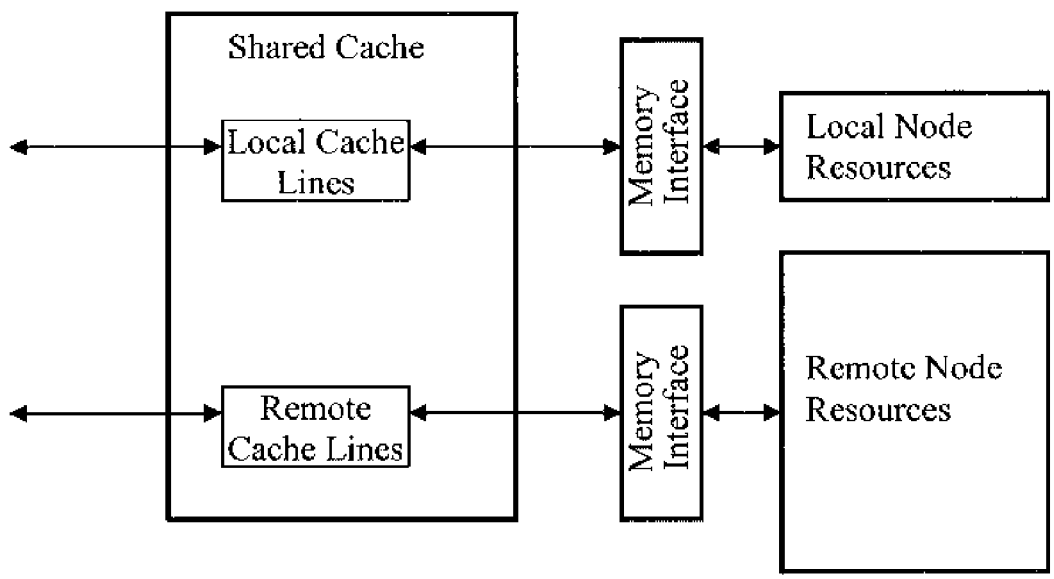
FIG. 1 illustrates a multi-node computer system employing the process of FIG. 2.

FIG. 1 illustrates a multi-node computer system having a plurality of processor nodes and a memory interface for each of said nodes functioning as local nodes and remote notes of a nest system, and a memory for said computer system including a plurality of cache lines, and having therein executing the system illustrated by FIG. 2 and the detailed description described herein below providing a system for ensuring fairness among remote requests within a multi-node computer system having local nodes and remote nodes having a shared cache. Executing in the multi-node computer system is a multi-node transport protocol in a multiprocessor system illustrated by FIG. 2 which provides a sequence of operation for communicating to a remote node according to the sequence that follows.

1. A processor initiated request, such a cache line fetch request, comes into a nest system with a shared cache level of coherency and encounters a miss.

2. As a result of the miss, a resource of a local node is loaded to fetch the requested line either from memory or a remote node of the multi-node multi-processor system.

3. The local node resource then sends a request to the remote node to load a resource onto the remote node for fetching the requested line back to the requesting local node.

4. (a) Sometimes, using a basic available procedure, upon being loaded in the remote node, a remote node resource turns on its' valid bit, indicating that it is valid for compare operations on the requested line and no other processor requests, either by another processor on a local node or a remote node, to the requested line can be initiated until the requestor has reset.

Then, if no conflict is encountered, the remote resource will fetch the line back to the requesting local node for processing update. If a conflict is encountered on the remote note, the remote requestor will send back a reject response to the requesting node and reset its' valid bit.

In prior situations, a requesting local node local resource upon seeing this conflict response will re-launch a request in an attempt to obtain the line under the premise that by the time the request was seen on the local node again, the point of conflict would be resolved. In the prior situations the re-launch would be repeated until the contention was resolved and a request completed successfully.

If during the time between a request being rejected and a local requestor re-launch a request to the remote node, the processors on the remote node have the opportunity to initiate new requests that could result in additional points of conflict and hence additional reject responses to the local requestor. This repeated rejection scenario results in a sub-optimal response time for a given request and allows for an "unfair" ordering of request processing due to the window it opens up where new processor initiated requests can come into the nest.

But in accordance with our invention the "unfairness" does not occur, as the window where new requests to a line can enter while there is an existing request already processing is eliminated.

4. (b) In our preferred embodiment, after receiving a request to load a resource on the remote node for fetching the requested line back to the requesting local node, the remote node resource turns on dual valid bit sets, where one set of valids will indicate if a resource is valid and actively working on the requested line, with the other set of valids will indicate if the resource was valid but some conflict exists that requires resolution before the request can complete.

5. Thereafter, when a remote requestor is rejected back to the local resource due to the existence of a conflict, a regular valid bit set for the requestor will turn off but the alternate valid bit set will remain active indicating that another node is currently trying to obtain ownership of the line.

6. When a local processor or I/O node tries to initiate a new request to the same line it encounters a compare against the remote requestor and will be forced to wait for its' completion before resuming a request.

Figure 3:
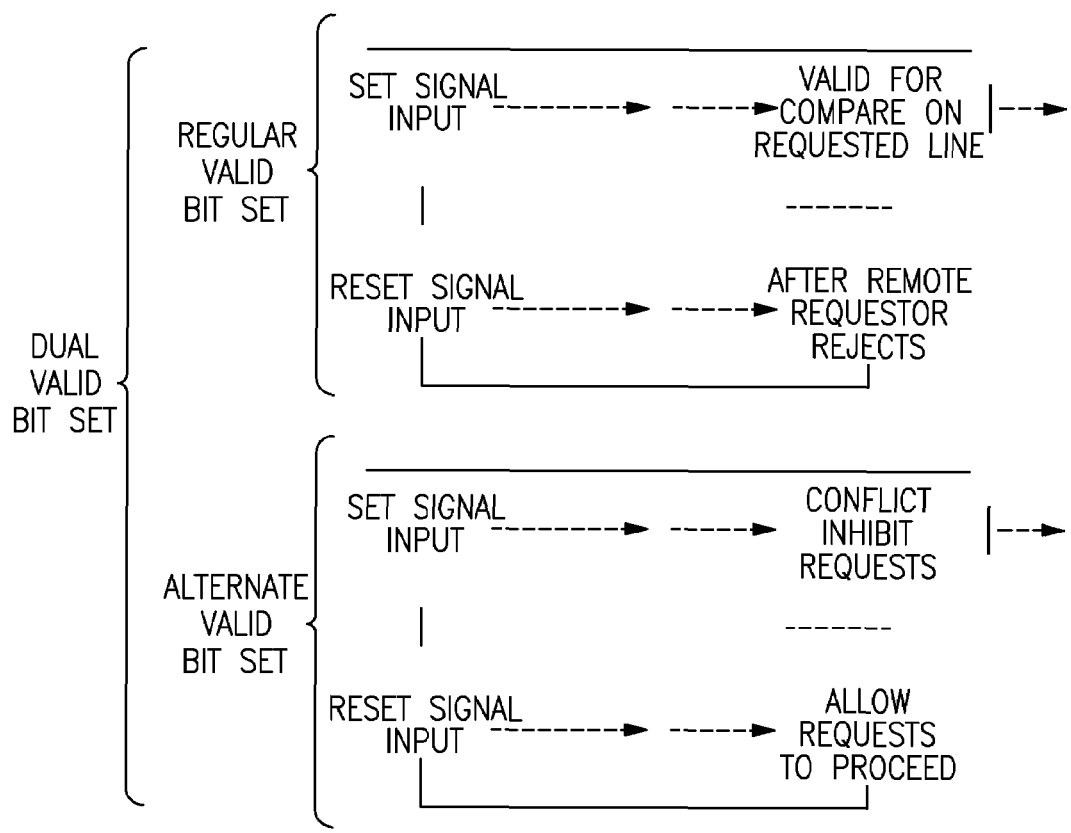
FIG. 3 shows the provision of dual valid bit sets with a regular valid bit set and alternate valid bit set for a muti-node three, four or n-way system the allows the alternate valid set to only inhibit the initiation of processor requests.

In a multi-node three, four or n-way system the provision of dual valid bit sets with a regular valid bit set and alternate valid bit set as shown in FIG. 3 allows the alternate valid bit set to only inhibit the initiation of processor requests, and in doing so avoids the potential for a multi-node hang due to multiple remote requestors encountering conflict against each other.

As a result of the dual valid bit sets multi-node fairness among remote requests is achieved through the use of the alternate valid bit sets which prevent new requests to a given line from entering the nest system of the multi-node system until all outstanding remote requests to that line have completed successfully.

These alternate valid bit sets go active in a remote resource when a point of contention is encountered that requests the remote requester to reject an operation back to the requesting node and subsequently reset their regular valid bits in preparation of the request re-launch from the originating node which will reload the remote requester. In as much operations within the nodes proceed normally during this time between the request and reload, as requests to other lines do not observe the ongoing contention, while requesters within the system currently encountering the contention use the basic available procedure for contention management to resolve their conflict as described in step 4 (a) above. The procedure of the dual valid bits sets with regular and alternate bits provided for in step 4 (b) prevents new interface requests to a given line from entering the nest system until all previously observed points of contention are resolved and the alternate bits are reset.

These alternate valid bit sets are used to generate a special address compare which interface requestors encounter (and honor) when they try to access a line under contention. This is similar to a regular address compare. But unlike a regular address compare, this special address compare remains active after the remote requester has turned off its' regular valid bit in order to stall new interface requests. Only on successful reload and completion of the remote operation does this alternate address valid bit reset and open the way for any pending interface requests to proceed.

This ensures that when line contention is encountered within a multi-node system all outstanding requests currently loaded in a local resource within the nest system are able to complete before new interface requests are allowed into the system.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method for ensuring fairness among remote requests within a multi-node computer system having local nodes and remote nodes having a shared cache, comprising the steps of:
   initiating a request from a local processor having a requesting local node into a nest system for use of a requested resource on a requested line on a remote node,
   reporting an encounter as a miss on said request,
   loading a resource of a local node to fetch the requested resource from either memory or the remote node of said multi-node process system, and wherein said local node resource sends a request to the remote node to load a resource on the remote node for fetching the requested line back to the requesting local node, wherein
   after receiving a request to load a resource onto the remote node for fetching the requested line back to the requesting local node, the remote node resource turns on dual valid bit sets, a regular one which will indicate if a resource is valid and actively working on the requested line, while another alternate valid will indicate if the resource was valid but some conflict exists that requires resolution before the request can complete.

2. The method of claim 1 wherein said remote node resource regular valid bit set indicates that it is valid for compare operations on a requested resource and no other processor requests, either by another processor on a local node or a remote node, to the requested resource can be initiated until the requestor has reset.

3. The method according to claim 2 wherein the requested resource is a cache line.

4. The method according to claim 3 wherein alternate valid bits prevent new requests to a given cache line from entering a multi-nodal computer system's nest system until all requests to the given cache line have been completed successfully.

5. The method according to claim 4 wherein alternate valid bits of said dual set of resource valids are provided for each remote requestor, where one set of valids indicates if the resource is valid and actively working on the line, and the other set of valids indicates if the resource was valid but encountered some conflict that requires resolution before the request can complete.

6. The method according to claim 1 wherein after dual valid bit sets are established, a remote requestor is rejected back to the local resource due to the existence of a conflict, and a regular valid bit set for the requestor will turn off, but the alternate valid bit set will remain active indicating that another node is currently trying to obtain ownership of the line.

7. The method according to claim 6 wherein a local processor node's new request to the same resource/line it encounters a compare against the remote requestor and will be forced to wait for its' completion before resuming a request.

8. The method according to claim 7 wherein only on successful reload and completion of the remote operation does this alternate address valid bit reset and open the way for any pending interface requests to proceed, so all outstanding requests currently loaded in a local resource within the nest system are able to complete before new interface requests are allowed into the system.

9. A method for ensuring fairness among remote requests within a multi-node computer system having local nodes and remote nodes having a shared cache, comprising the steps of:
   initiating a request from a local processor having a requesting local node into a nest system for use of a requested resource on a requested line on a remote node,
   reporting an encounter as a miss on said request,
   loading a resource of a local node to fetch the requested resource from either memory or the remote node of said multi-node process system, and wherein said local node resource sends a request to the remote node to load a resource on the remote node for fetching the requested line back to the requesting local node, wherein
   after receiving a request to load a resource onto the remote node for fetching the requested line back to the requesting local node and receiving some indication that the request will be rejected back to the requesting node, the remote node resource activates a mechanism that will actively prevent new interface requests from entering the system until said mechanism resets.

10. The method according to claim 9 wherein said mechanism prevents new requests from entering a multi-nodal computer system's nest system until all requests to the given cache line have been completed successfully.

11. The method according to claim 10 wherein a local processor node's new request to the same resource it encounters a compare against said mechanism and will be forced to wait for it's reset before resuming a request.

12. The method according to claim 11 wherein only on successful reload and completion of the remote operation does this mechanism reset and open the way for any pending interface requests to proceed, so all outstanding requests currently loaded in a local resource within the nest system are able to complete before new interface requests are allowed into the system.

* * * * *